Dec. 22, 1959  H. J. THOMAS  2,918,317
DOOR LATCH FOR PILLARLESS AUTOMOBILE
Filed Dec. 24, 1956  6 Sheets-Sheet 1
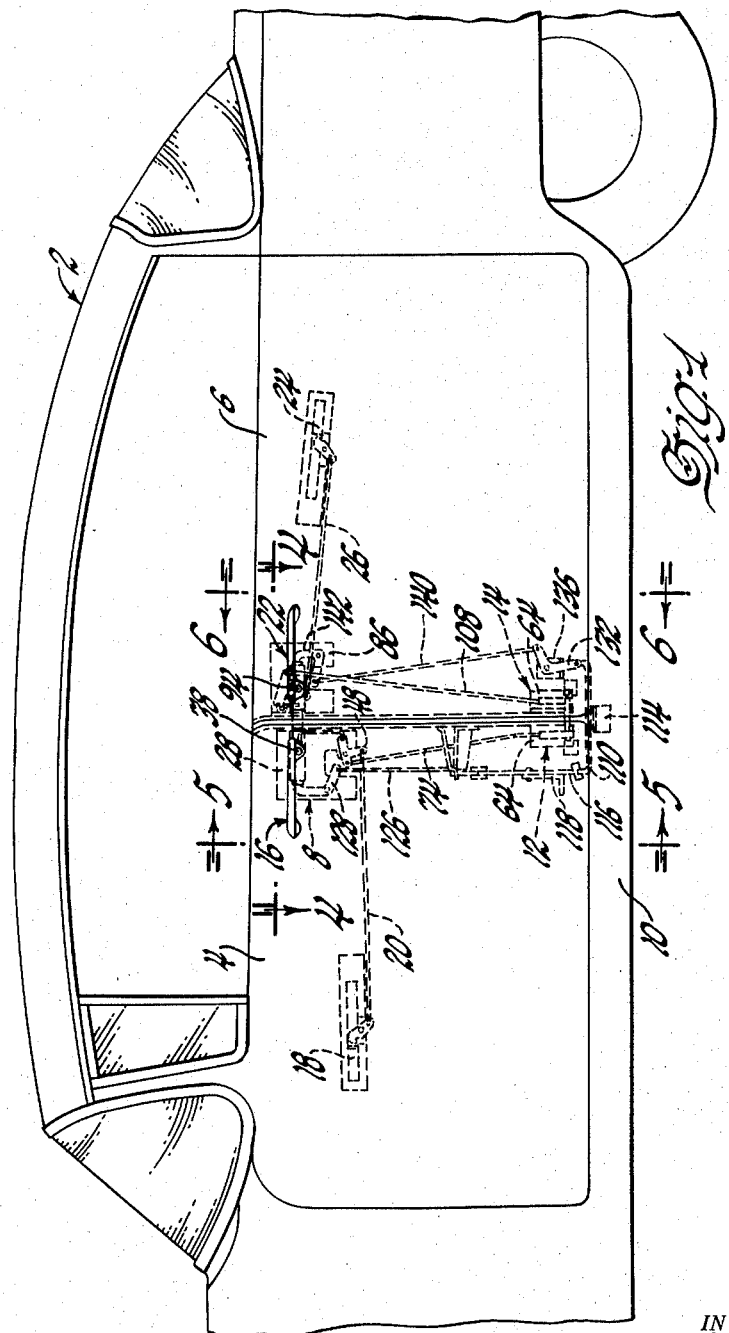
INVENTOR.
Herman J. Thomas
BY
W. S. Pettigrew
Attorney

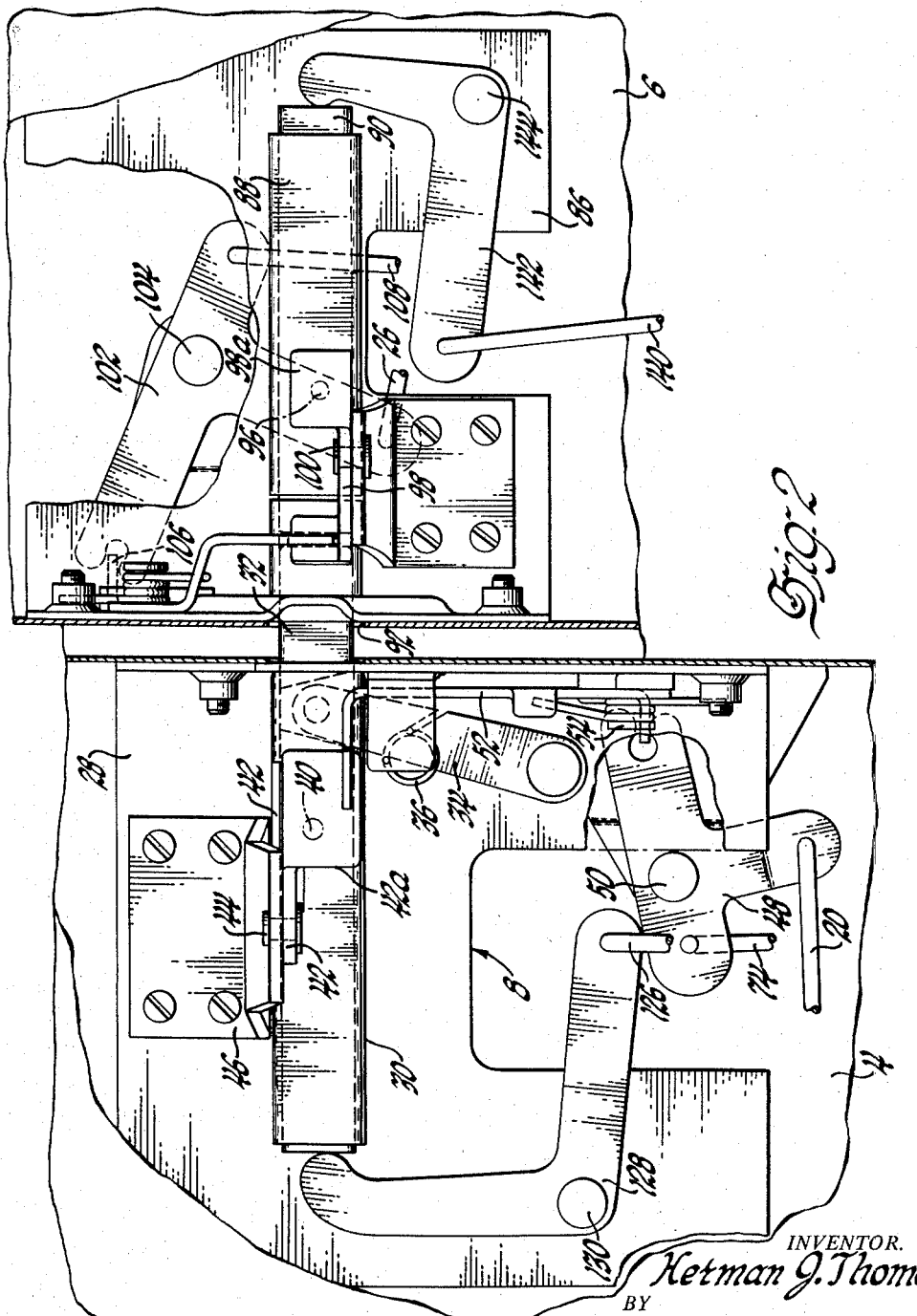

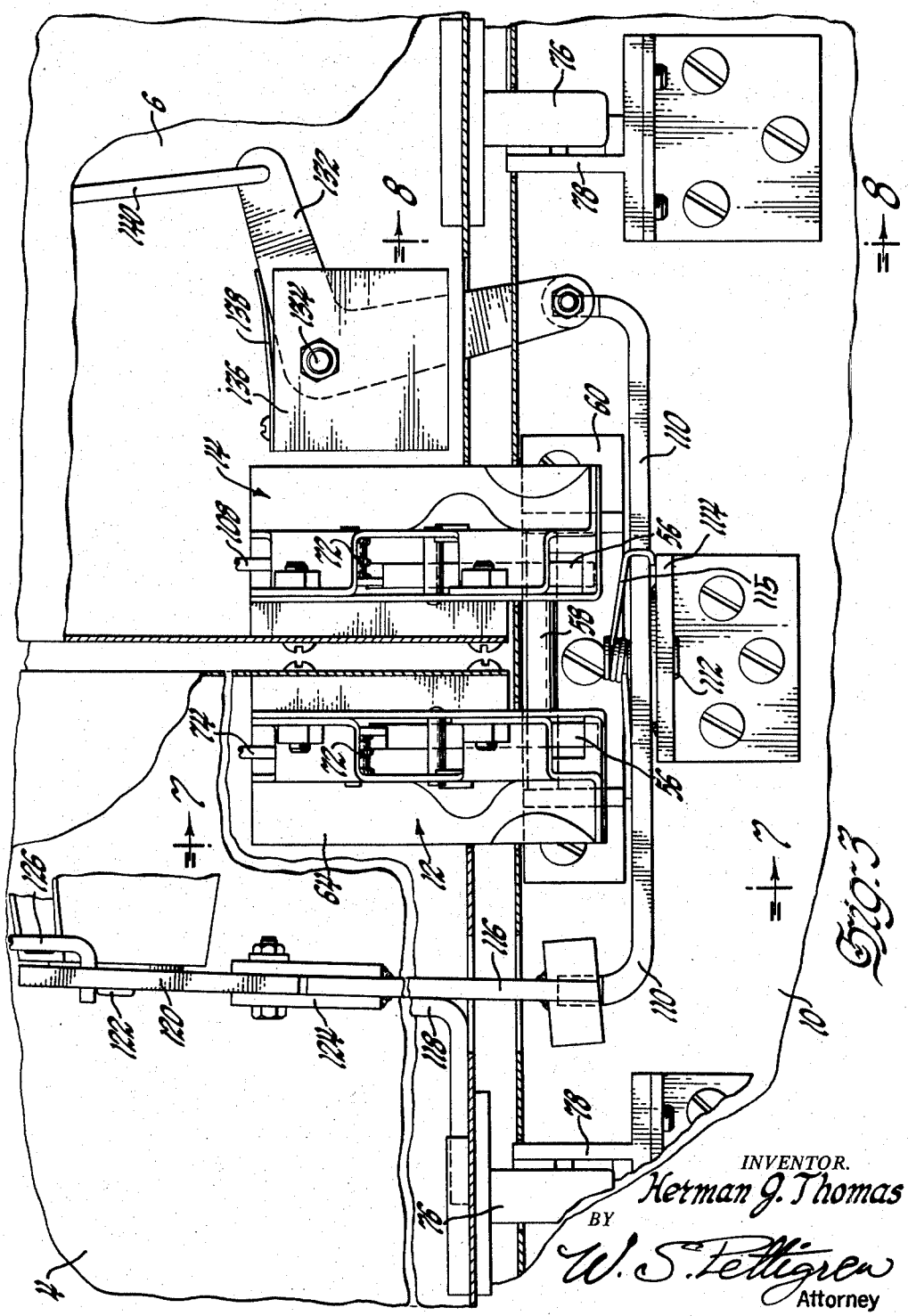

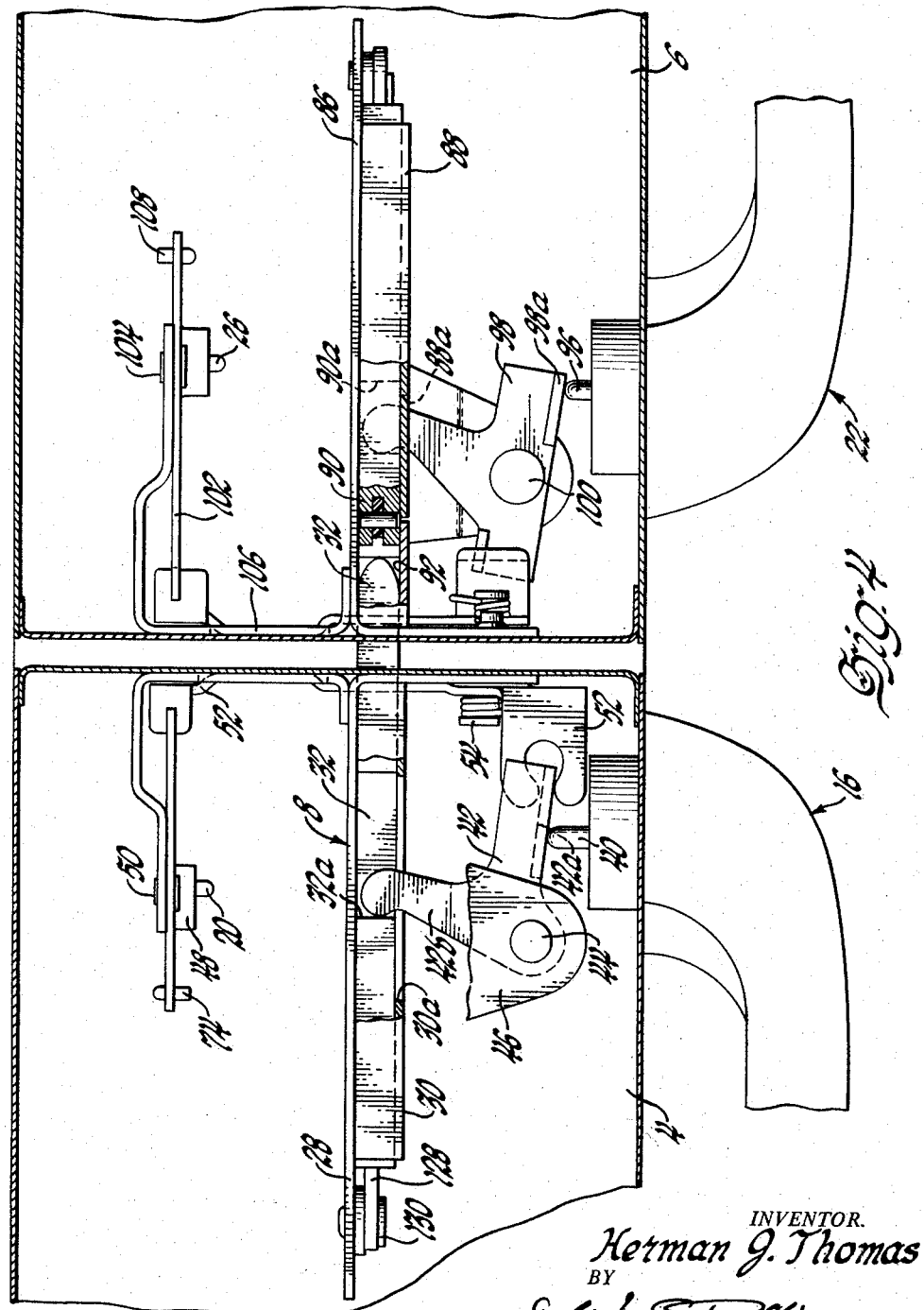

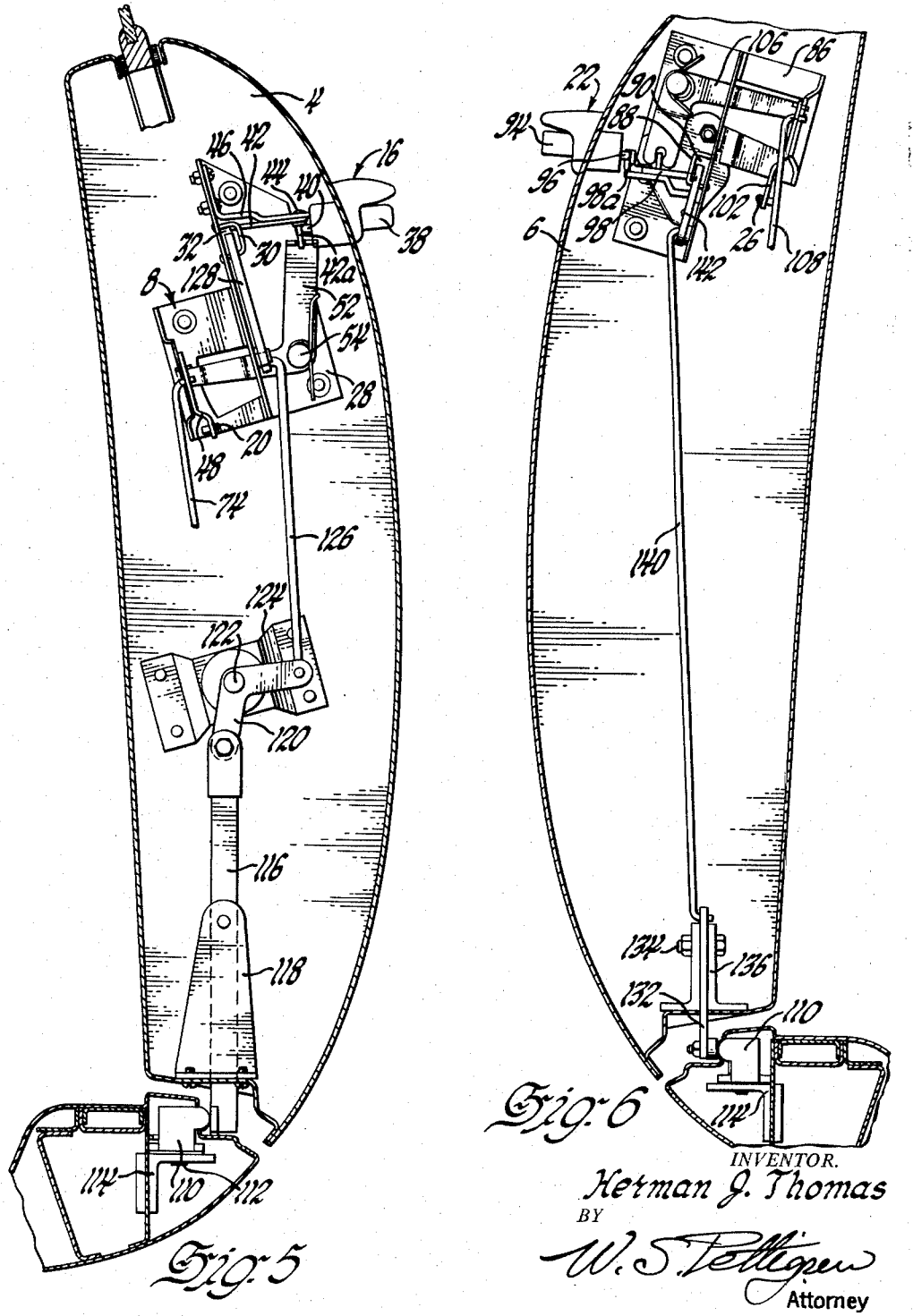

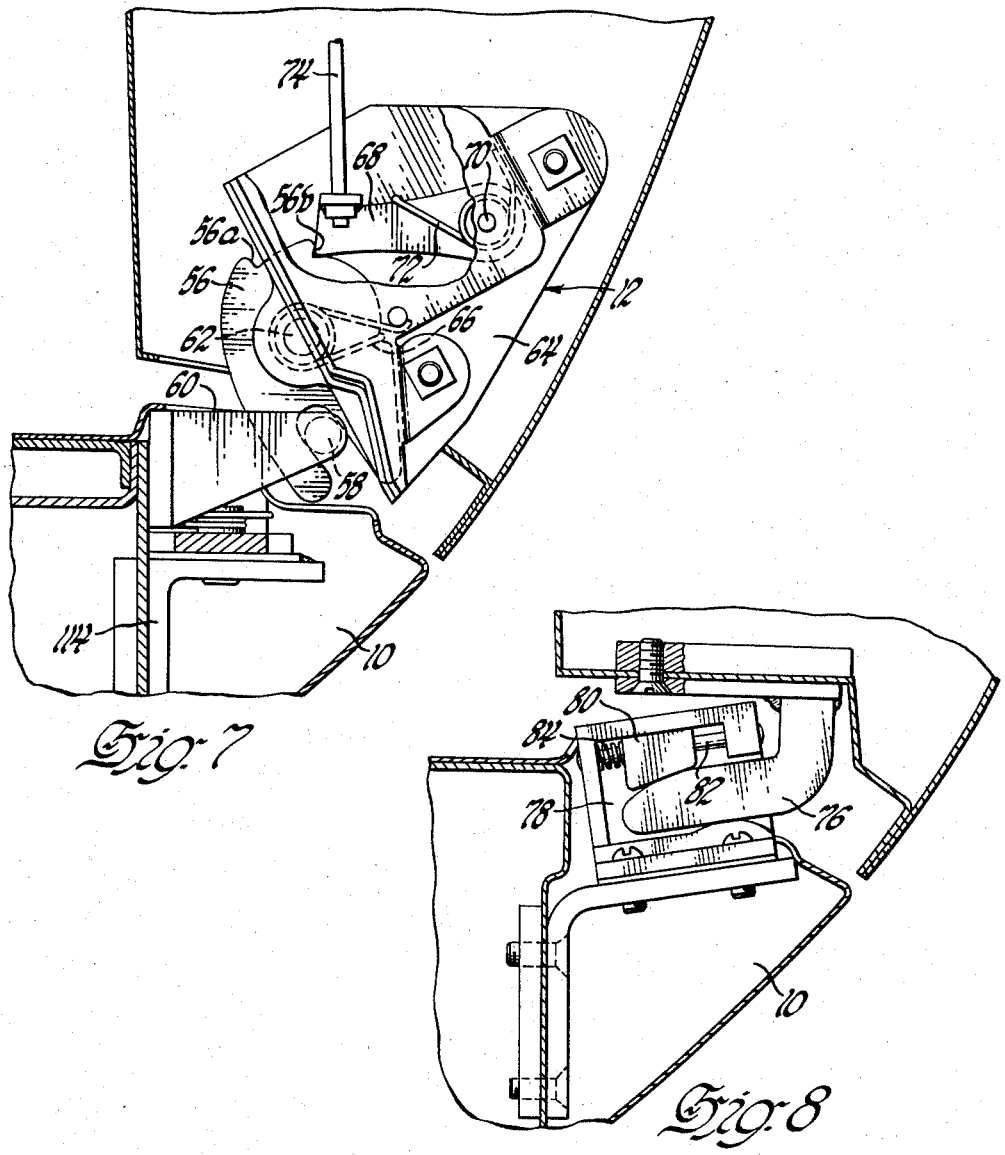

United States Patent Office 2,918,317
Patented Dec. 22, 1959

2,918,317

DOOR LATCH FOR PILLARLESS AUTOMOBILE

Herman J. Thomas, Roseville, Mich., assignor to General Motors Corporation, Detroit, Mich., a corporation of Delaware Application December 24, 1956, Serial No. 630,110

9 Claims. (Cl. 292—5)

This invention relates to an automobile door latching means, and more particularly to a latching arrangement for a pillarless four-door automobile.

One feature of the invention is that it provides improved door latching means; another feature of the invention is that it provides an improved mechanically operated latch for a pillarless automobile having front and rear doors, the free edges of which lie closely adjacent each other when the doors are closed; another feature of the invention is that it provides a bolt slidably carried on one door for latching engagement with a keeper carried by the other door and a retractor on said other door for moving the bolt out of the keeper to open said other door; still another feature of the invention is that it provides novel means for moving the bolt to projected position in response to closing movement of either door when the other door is closed; and yet a further feature of the invention is that it provides an actuating member movably mounted on the body and first and second control means in the respective doors adapted to engage the actuating member for moving the bolt to projected position in response to closing movement of either door when the other door is closed.

Other features and advantages of the invention will be apparent from the following description and the drawings, in which:

Fig. 1 is a fragmentary side elevation of an automobile having the improved latching means, structure which underlies the outer panels of the automobile doors and body being shown in broken lines;

Fig. 2 is an enlarged vertical longitudinal section taken adjacent the belt line of the automobile and showing a portion of the apparatus of Fig. 1;

Fig. 3 is an enlarged vertical longitudinal section taken adjacent the rocker panel of the automobile and showing another portion of the apparatus of Fig. 1;

Fig. 4 is an enlarged fragmentary horizontal section taken along the line 4—4 of Fig. 1;

Fig. 5 is an enlarged transverse vertical section taken along the line 5—5 of Fig. 1;

Fig. 6 is an enlarged transverse vertical section taken along the line 6—6 of Fig. 1;

Fig. 7 is a detail section through a portion of the front door and the rocker panel taken along the line 7—7 of Fig. 3; and Fig. 8 is a detail section through a portion of the rear door and rocker panel taken along the line 8—8 of Fig. 3.

This door latch is particularly designed for a pillarless four-door automobile of the type designated generally as 2 in Fig. 1. The automobile has a front door 4 hingedly mounted at its front side on the body and a rear door 6 hingedly mounted at its rear side on the body. These doors are of the so-called convertible type which do not have a window frame so consequently there is no means for latching the doors to the side roof rail of an automobile. The hinge mounting means for the doors may be conventional and are not illustrated.

The doors 4 and 6 are latched to each other by a main latch designated generally as 8 and the front door is latched at its lower rear corner to the automobile sill or rocker panel 10 by a subsidiary sill latch 12, while the rear door is latched at its lower front corner to the sill 10 by a subsidiary sill latch 14. The front door may be opened from the outside by means of a push button and handle device 16 or the door may be opened from the inside by means of a remotely located handle 18 connected to the main latch through an actuating rod 20. The rear door may be opened from the outside by means of an outside push button and handle device 22 or it may be opened from the inside by means of a remotely located inside handle 24 connected to the rear door latch operating means through an actuating rod 26.

Main latch

The main latch, which is carried by the front door, comprises a latch frame 28 bolted to the inner surface of the jamb face of the front door. Bolt sheath 30 is mounted on the frame 28 and extends horizontally, terminating at its rear end adjacent the jamb face of the door. Inside this sheath, there is a slidable bolt 32. A throw link 34 is connected to the bolt and extends generally vertically downwardly therefrom, being pivoted on the frame, and an overcenter spring 36 is connected between the latch frame and the throw link to hold the bolt either in a retracted position in which the rear end of the bolt lies substantially flush with the jamb face of the front door or a projected position in which the bolt is moved towards the rear door so that its end is in latching engagement in a keeper in the rear door when the doors are closed.

The front door push button and handle device 16 carries a slidable push button 38 with a push rod 40 having its free end lying adjacent a flange 42a on one arm of a bolt-operating bell crank which is pivoted at 44 on a bracket 46 which is secured to and projects outwardly from the frame 28. The other arm 42b of this bell crank extends through an opening 30a in the bolt sheath 30 and terminates in a slot 32a formed in the upper surface of the bolt. When the push button 38 is pushed in the bolt-operating bell crank 42 pivots so that its arm 42b swings forwardly (counterclockwise in Fig. 4) engaging a shoulder at the forward end of the slot 32a and moving the bolt toward retracted position. As the bolt approaches retracted position, the overcenter spring 36 takes over and moves the bolt to its retracted position and yieldably holds it there.

In order to retract the bolt 32 from inside the automobile, the inside remote handle 18 is moved. This handle is illustrated as being a slidable handle which may be of the type shown and described in Patent No. 2,709,-102, issued on May 24, 1955, to Phinney et al., or the handle may be a conventional type of turn handle well known in the art. When the handle 18 is operated, it pulls forwardly on rod 20. The rear end of rod 20 is connected to a remote lever 48 which is pivoted at 50 on a bracket extending from the latch frame. Lever 48 has a slotted arm which extends rearwardly from the pivot and is connected to a flange on the end of an arm of a bell crank 52 which is pivoted at 54 on the latch frame. The other arm of this bell crank extends upwardly and terminates in a turned flange having a bifurcated portion which straddles the flange 42a on the bolt-operating bell crank 42 so that operation of the inside remote handle swings the bell crank 42 in the same manner as does operation of the outside push button 38.

Sill latches

As pointed out earlier, the front door is latched to the body sill or rocker panel 10 by a sill latch designated generally as 12 and the rear door is latched to the body sill by a sill latch designated generally as 14. Since the latches 12 and 14 are identical, only one will be described. This latch, as shown in Fig. 7, includes a bifurcated bolt 56, the fingers of which straddle a keeper bar 58 on a keeper bracket 60 affixed to the rocker panel 10. The bolt 56 is pivotally mounted at 62 on a portion of the sill latch frame 64, and a hairpin type spring 66 biases the bolt in a clockwise direction as the parts appear in Fig. 7 towards unlatched position. The bolt 56 is held in latched position by a detent 68 pivoted at 70 on the sill latch frame 64 and urged into engagement with the bolt by a spring 72. A safety latching shoulder 56a and a final latching shoulder 56b are formed on the bolt 56 for engagement with the detent. The detent 68 is connected by a rod 74 to the remote lever 48 so that operation of the inside door handle or the outside push button will pull up on the rod 74 and swing the detent 68 out of engagement with the bolt latching shoulder 56b simultaneously with the retraction of the slide bolt by the bolt-operating bell crank 42 so that the door 4 may be opened. When the door is closed, the bifurcated end of the bolt hits the striker bar and the bolt is pivoted toward latched position, the detent camming over the safety latching shoulder 56a into holding engagement with the latching shoulder 56b. The door carries a dovetail guide member 76 which, when the door is closed projects into a dovetail housing 78 which is bolted to the sill 10. A shoe 80 is mounted in the housing on a rod 82 and is urged outwardly by a compression spring 84 into tight engagement with the dovetail guide 76 to hold the door against rattling. Fig. 8, while it shows this structure in the rear door 6, may be referred to for a disclosure of the dovetail device in the front door since the device is similar on the front and rear doors.

*Bolt retractor*

Since the front and rear doors are latched together by means of a single bolt which is carried in the front door, bolt retractor means are provided in the rear door so that the rear door may be opened even though the front door is closed. The retractor structure is basically similar to the main latch structure. A retractor frame 86 is bolted to the inside jamb face of the rear door between the inner and outer door panels. This frame mounts a retractor sheath 88 inside of which a retractor member 90 is slidably mounted. This retractor is quite similar to the bolt 32 except that it never projects forwardly beyond the jamb face of the rear door and its function is to push the bolt out of the rear door keeper 92 to retracted position. The retractor member 90 is movable between an operative (rear) and operated (forward) position by a rear door outside push button 94, the push rod 96 of which terminates closely adjacent a flange 98a on a retractor operating lever 98 which is pivoted at 100 on a bracket projecting from the retractor frame 86. One arm of this lever extends through an opening 88a in the retractor sheath into a notch 90a in the retractor member so that operation of the push button 94 swings this arm counterclockwise (Fig. 4) to move the retractor member to its operated position in which its forward end lies in the keeper 92 substantially in the plane of the jamb face of the rear door 6. Assuming the bolt 32 to have been in latched position in the keeper 92, movement of the retractor from operative to operated position will push the bolt out of the keeper to the retracted position of the bolt. The elongated slot 32a in the bolt permits this movement without moving the bolt operating bell crank. The retractor may be moved by the rear door inside handle 24 as well as by the push button 94. The handle 24 is illustrated as a sliding handle similar to the handle shown and described in Patent No. 2,709,102 although a turn handle may be used if desired. Movement of the handle pulls on rod 26, the free end of which is connected to a bell crank 102 pivotally mounted on an extension of the retractor frame 86 by a stud 104. One arm of this bell crank has a bifurcated portion which is connected to another bell crank 106 which in turn is connected to the retractor operating lever 98 so that movement of the remote handle 24 shifts the retractor member 90 to operated position in the same manner as does operation of the outside push button 94.

The rear door sill latch 14 is similar in construction and operation to the front door sill latch 12 described above, having a bolt 56 for engagement with a striker on the sill 10 and being held by a detent 68 which is connected by a rod 108 to the bell crank 102. Operation of either the outside push button or the inside remote handle releases the rear door sill latch simultaneously with the movement of the retractor member to operated position so that the rear door may be opened from inside or from outside the automobile regardless of the position of the front door. The rear door has a dovetail arrangement similar to that described for the front door and shown in Fig. 8.

*Bolt projection means*

Bolt projection means are provided for moving the bolt to projected position in response to closing movement of either door when the other door is closed. Since the bolt 32 is carried by the front door and engages with the keeper 92 on the rear door, it would not be feasible to allow the bolt to be projected unless both doors are closed. If the bolt is projected when neither door is closed or while only one door is closed, closure of the other door will jam the edge of the rear door against the projecting end of the bolt, damaging both the bolt and the rear door.

Referring to Figs. 3, 5 and 6, an actuating member 110 is rockably mounted for swinging movement in a horizontal plane on a stud 112 projecting from a bracket 114 which is screwed to the rocker panel 10 and each door carries control means adapted to engage the actuating member when that door is closed. A torsion spring 115 is wound on the stud 112 and has one end anchored on the body and the other end anchored on the actuating member 110 to bias the left end (Fig. 3) of the member 110 toward engagement with a control member described below. When both doors are closed, the control means and actuating member function to project the bolt into the rear door keeper 92. In the front door there is a first control member 116 which projects through an opening in the lower edge of the door. This control member is pivotally mounted intermediate its ends on an upstanding bracket 118 secured to the bottom wall of the door so that the control member may swing in a vertical plane parallel to the plane of the jamb edge of the door, i.e., the lower exposed end of the control member may swing inwardly or outwardly with respect to the vehicle body. The upper end of the control member is pivotally connected to one arm of a bell crank 120 which is pivoted at 122 on a bracket 124 which is mounted on the jamb face of the door. The other arm of the bell crank is connected by a rod 126 to one arm of a bolt-projecting bell crank 128 pivoted at 130 on the main latch frame 28. Bell crank 120 changes the direction of the force exerted by control member 116. The other arm of the bell crank 128 lies adjacent the forward end of the bolt 32 so that swinging the bell crank 128 moves the bolt to its projected position.

In the rear door, there is a second control member 132 which is formed as a bell crank and is pivoted at 134 on a bracket 136 upstanding from the lower wall of the rear door. A leaf spring 138 bears against this bell crank to urge it in a clockwise direction as the parts appear in the drawings. The free arm of the control member 132 extends through an elongated opening in the lower wall of the door and is swingable in a vertical plane parallel to the plane of the door panel, i.e., in directions longitudinal of the automobile body. The control member 132 is connected by a rod 140 to a retractor-operating bell crank 142 pivotally mounted at 144 on the retractor frame 86.

The arrangement of the parts is such that the slide bolt 32 is projected only when both doors are closed no matter in which sequence the doors are closed. The position of the front door control member 116 is determined by the position of the bolt 32. When the bolt 32 is projected, the control member is swung outwardly where it will not strike the outwardly turned end of the rockable actuating member 110 when the front door is closed. When the bolt 32 is retracted, the control member 116 is swung inwardly as shown in Fig. 5 where it will strike the end of the actuating member 110 when the front door is closed. In the rear door, the rear door control member 132 which projects below the bottom of the door is shiftable in directions longitudinal of the vehicle body. When the retractor member 90 is in its operative (rearmost) position, the control member 132 is swung rearwardly out of alignment with the outwardly turned end of the actuating member 110. However, when the retractor 90 is in its forward or operated position, the control member is shifted forwardly into alignment with the end of the actuating member 110 as shown in Fig. 6. When the rear door is open the retractor member is in operated position. If the front door is closed while the rear door is still open, closing the rear door will cause the control member 132 to strike the outwardly turned end of the actuating member 110 and rock this member on its pivot so that the other outwardly turned end of the member will swing the front door actuator outwardly of the vehicle body, causing the bell crank 142 to project the bolt 32. During its movement, the bolt will push the retractor 90 in the rear door rearwardly so that it swings bell crank 142 and pulls up on rod 140 to swing the rear door control member 132 out of alignment with the end of the actuating member 110.

When the front door is open the bolt 32 is retracted. If the rear door is closed and the front door is open, closing the front door will cause its control member 116 to strike the actuator 110 which will now be held against rocking motion by the rear door control member 132 so that the front door control member 116 will be shifted outwardly of the vehicle body to project the bolt and at the same time to shift the bolt retractor and cause the rear door control member 132 to move out of engagement with the actuating member 110.

While I have shown and described one embodiment of my invention, it is capable of many modifications. Changes, therefore, in the construction and arrangement may be made without departing from the spirit and scope of the invention as set forth in the appended claims.

I claim:

1. A door latching system for a pillarless automobile having a body with unitary front and rear doors, the free edges of which lie closely adjacent each other when the doors are closed, comprising: a bolt mounted on one door for movement between a retracted position and a projected position in latching engagement with the other door when said doors are closed; means on said one door for moving the bolt from projected to retracted position to open said one door; means on said other door for moving the bolt from projected to retracted position to open said other door; and means for moving the bolt to projected position in response to closing movement of either door when the other door is closed, comprising an actuating member movably mounted on said body, first control means on said one door adapted to engage said actuating member when said one door is closed, and second control means on said other door adapted to engage said actuating member when said other door is closed.

2. A door latching system for a pillarless automobile having a body with unitary front and rear doors, the free edges of which lie closely adjacent each other when the doors are closed, comprising: a bolt mounted on the front door for movement between a retracted position and a projected position in latching engagement with the rear door when said doors are closed; means on said front door for moving the bolt from projected to retracted position to open said front door; means on said rear door for moving the bolt from projected to retracted position to open said rear door; and means for moving the bolt to projected position in response to closing movement of either door when the other door is closed, comprising an actuating member movably mounted on said body, first control means for projecting the bolt, said control means being mounted on the front door and being adapted to engage said actuating member when the front door is closed, and second control means on the rear door adapted to engage said actuating member when the rear door is closed.

3. A door latching system for a pillarless automobile having a body with unitary front and rear doors, the free edges of which lie closely adjacent each other when the doors are closed, comprising: a bolt mounted on one door for movement between a retracted position substantially entirely inside said one door and a projected position in latching engagement with the other door when said doors are closed; first latch means on said one door for latching said one door to the body; second latch means on said other door for latching said other door to the body; means on said one door for moving the bolt from projected to retracted position and for simultaneously releasing said first latch means when the bolt is moved to retracted position to open said one door; means on said other door for moving the bolt from projected to retracted position and for simultaneously releasing said second latch means to open said other door; and means for moving the bolt to projected position in response to closing movement of either door when the other door is closed, comprising an actuating member movably mounted on said body, first control means on said one door adapted to engage said actuating member when said one door is closed, and second control means on said other door adapted to engage said actuating member when said other door is closed.

4. A door latching system for a pillarless automobile having a body with unitary front and rear doors, the free edges of which lie closely adjacent each other when the doors are closed, comprising: a bolt slidably mounted on one door for movement between a retracted position and a projected position in latching engagement with a keeper on the other door when said doors are closed; means on said one door for moving the bolt from projected to retracted position to open said one door; a retractor on said other door for engaging and moving the bolt out of said keeper from projected to retracted position to open said other door; means for operating said retractor; and means comprising an actuator on the body and control members in both doors adapted to engage and move said actuator for moving the bolt to projected position in response to closing movement of either door when the other door is closed.

5. A door latching system for a pillarless automobile having a body with unitary front and rear doors, the free edges of which lie closely adjacent each other when the doors are closed, comprising: a bolt slidably mounted on one door for movement between a retracted position and projected position in latching engagement with a keeper on the other door when said doors are closed; yieldable means holding said bolt in either of said positions; means on said one door for moving the bolt from projected to retracted position to open said one door; a retractor on said other door for engaging and moving the bolt out of said keeper from projected to retracted position to open said other door; means for operating said retractor; and means comprising an actuator on the body and control members in both doors adapted to engage and move said actuator for moving the bolt to projected position in response to closing movement of either door when the other door is closed.

6. A door latching system for a pillarless automobile having a body with unitary front and rear doors, the free edges of which lie closely adjacent each other when the doors are closed, comprising: a bolt slidably mounted on the front door for movement between a retracted position and a projected position in latching engagement with a keeper on the rear door when said doors are closed; overcenter spring means holding said bolt in either of said positions; means on said front door for moving the bolt from projected to retracted position to open the front door; a retractor on the rear door for engaging and moving the bolt out of said keeper from projected to retracted position to open the rear door; means for operating said retractor; and means comprising an actuator on the body and control members in both doors adapted to engage and move said actuator for moving the bolt to projected position in response to closing movement of either door when the other door is closed.

7. A door latching system for a pillarless automobile having a body with unitary front and rear doors, the free edges of which lie closely adjacent each other when the doors are closed, comprising: a bolt slidably mounted on one door for movement between a retracted position substantially entirely inside said one door and a projected position in latching engagement with a keeper on the other door when said doors are closed; first latch means on said one door for latching said one door to the body; second latch means on said other door for latching said other door to the body; means on said one door for moving the bolt from projected to retracted position and for simultaneously releasing said first latch means when the bolt is moved to retracted position to open said one door; a retractor on said other door for moving the bolt out of said keeper from projected to retracted position; means for operating said retractor and simultaneously for releasing said second latch means to open said other door; and means comprising an actuator on the body and control members in both doors adapted to engage and move said actuator for moving the bolt to projected position in response to closing movement of either door when the other door is closed.

8. A door latching system for a pillarless automobile having a body with unitary front and rear doors, the free edges of which lie closely adjacent each other when the doors are closed, comprising: a bolt slidably mounted on one door for movement between a retracted position and a projected position in latching engagement with a keeper on the other door when said doors are closed; means on said one door for moving the bolt from projected to retracted position to open said one door; a retractor on said other door for moving the bolt out of said keeper from projected to retracted position to open said other door; means for operating said retractor; and means for moving the bolt to projected position in response to closing movement of either door when the other door is closed, comprising an actuating member movably mounted on said body, first control means on said one door adapted to engage said actuating member when said one door is closed, and second control means on said other door adapted to engage said actuating member when said other door is closed.

9. A door latching system for a pillarless automobile having a body with front and rear doors, the free edges of which lie closely adjacent each other when the doors are closed, comprising: a bolt slidably mounted on one door for movement between a retracted position and projected position in latching engagement with a keeper on the other door when said doors are closed; overcenter spring means holding said bolt in either of said positions; first latch means on said one door for latching said one door to the body; second latch means on said other door for latching said other door to the body; means on said one door for moving the bolt from projected to retracted position and for simultaneously releasing said first latch means when the bolt is moved to retracted position to open said one door; a retractor on said other door for moving the bolt out of said keeper from projected to retracted position; means for operating said retractor and simultaneously for releasing said second latch means to open said other door; and means for moving the bolt to projected position in response to closing movement of either door when the other door is closed, comprising an actuating member movably mounted on said body, first control means on said one door adapted to engage said actuating member when said one door is closed, and second control means on said other door adapted to engage said actuating member when said other door is closed.

References Cited in the file of this patent

UNITED STATES PATENTS

| | | |
|---|---|---|
| 279,334 | Clark | June 12, 1883 |
| 323,308 | Finck | July 28, 1885 |
| 1,869,274 | Phillips | July 26, 1932 |
| 1,880,585 | Tibbetts | Oct. 4, 1932 |
| 2,811,382 | Harman | Oct. 29, 1957 |
| 2,822,203 | Griswold et al. | Feb. 4, 1958 |
| 2,827,321 | Leslie et al. | Mar. 18, 1958 |